United States Patent
You

(10) Patent No.: US 10,600,221 B2
(45) Date of Patent: Mar. 24, 2020

(54) SYSTEM, METHOD, AND ELECTRONIC DEVICE FOR INFORMATION DUPLICATION AND MACHINE-READABLE STORAGE MEDIUM

(71) Applicant: GUANGZHOU ALIBABA LITERATURE INFORMATION TECHNOLOGY CO., LTD., Guangzhou (CN)

(72) Inventor: Yang You, Guangzhou (CN)

(73) Assignee: GUANGZHOU ALIBABA LITERATURE INFORMATION TECHNOLOGY CO., LTD., Guangzhou (CN)

(*) Notice: Subject to any disclaimer, the term of this patent is extended or adjusted under 35 U.S.C. 154(b) by 0 days.

(21) Appl. No.: 16/085,032

(22) PCT Filed: Jan. 19, 2017

(86) PCT No.: PCT/CN2017/071758
§ 371 (c)(1),
(2) Date: Sep. 14, 2018

(87) PCT Pub. No.: WO2017/157104
PCT Pub. Date: Sep. 21, 2017

(65) Prior Publication Data
US 2019/0102925 A1 Apr. 4, 2019

(30) Foreign Application Priority Data
Mar. 17, 2016 (CN) .......................... 2016 1 0154003

(51) Int. Cl.
*G06T 11/60* (2006.01)
*G06F 3/0481* (2013.01)
(Continued)

(52) U.S. Cl.
CPC ............ *G06T 11/60* (2013.01); *G06F 3/0481* (2013.01); *G06F 3/0484* (2013.01); *G06K 9/2063* (2013.01); *G06K 9/2081* (2013.01)

(58) Field of Classification Search
CPC ....... G06T 11/60; G06T 7/11; G06K 2209/01; G06K 9/3258; G06K 9/00456;
(Continued)

(56) References Cited

U.S. PATENT DOCUMENTS

2006/0288004 A1* 12/2006 Toriyama ................ G06F 16/33
2007/0124700 A1   5/2007 Koivisto et al.
(Continued)

FOREIGN PATENT DOCUMENTS

CN    1592453 A    3/2005
CN  103838707 A    6/2014
(Continued)

OTHER PUBLICATIONS

The World Intellectual Property Organization (WIPO) International Search Report for PCT/CN2017/071758 dated Apr. 24, 2017 4 Pages.

*Primary Examiner* — Haixia Du
(74) *Attorney, Agent, or Firm* — Anova Law Group, PLLC

(57) ABSTRACT

The embodiments of the present invention provide an information-duplication system, an information duplication method, an electronic device, and a machine-readable storage medium. First, a selection region is determined according to a duplication operation of a user on the display content of an electronic device. Then, the text information corresponding to the selection region is converted into pictures. Finally, the pictures converted from the text information in the selection region are merged with the pictures in the selection region, and the picture generated after merging is
(Continued)

then shared as a duplication content. The embodiments of the present invention can realize the simultaneous presence of text information and pictures in the duplication content.

20 Claims, 4 Drawing Sheets

(51) Int. Cl.
*G06F 3/0484* (2013.01)
*G06K 9/20* (2006.01)

(58) Field of Classification Search
CPC ............... G06K 9/00442; G06K 9/325; G06K 2009/00489; G06F 16/5846; H04N 2201/3266; H04N 1/32144
See application file for complete search history.

(56) References Cited

U.S. PATENT DOCUMENTS

| | | | | |
|---|---|---|---|---|
| 2007/0200922 | A1* | 8/2007 | Ueno | H04N 7/15 348/14.08 |
| 2013/0159843 | A1* | 6/2013 | Wan | G06F 17/211 715/248 |
| 2013/0162664 | A1* | 6/2013 | Peacock | G06T 1/60 345/543 |

FOREIGN PATENT DOCUMENTS

| | | | |
|---|---|---|---|
| CN | 105320509 | A | 2/2016 |
| CN | 105988665 | A | 10/2016 |

\* cited by examiner

SYSTEM, METHOD, AND ELECTRONIC DEVICE FOR INFORMATION DUPLICATION AND MACHINE-READABLE STORAGE MEDIUM

CROSS-REFERENCE TO RELATED APPLICATIONS

This application is a national phase entry under 35 U.S.C. § 371 of International Application No. PCT/CN2017/071758, filed on Jan. 19, 2017, which claims priority to and benefits of Chinese Patent Application Serial No. CN201610154003.X, filed with the State Intellectual Property Office of P. R. China on Mar. 17, 2016, the entire content of all of which is incorporated herein by reference.

FIELD OF THE INVENTION

The present invention generally relates to the field of intelligent electronic devices and, more particularly, relates to an electronic device, and a system, method, electronic device, and machine-readable storage medium for information duplication for duplicating display content on the electronic device.

BACKGROUND

Currently, with the development of computer technology and electronic technology, electronic devices such as smart mobile phones, mobile Internet devices (MIDs), personal digital assistants (PDAs), and tablet computers have become indispensable tools for communication and entertainment in people's daily work and life. Users often use electronic devices for daily reading. When finding a content of interest during reading, users often want to make duplicates for sharing the content of interest. However, when the duplicated content includes both text information and pictures, the pictures in the duplicated content are often filtered out, causing the duplicated content inconsistent with the originally displayed content and affecting the user experience.

BRIEF SUMMARY OF THE INVENTION

In view of this, an object of the embodiments of the present invention is to provide an information-duplication system, including:

a selected-region determination module, configured to, in response to a duplication operation of a display content on an electronic device, determine a selection region according to the duplication operation;

a first acquisition module, configured to acquire the text information in the selection region;

a conversion module, configured to convert the text information into pictures;

a second acquisition module, configured to acquire pictures in the selection region; and a merging module, configured to merge the pictures converted from the text information with the pictures acquired in the selection region, and share the picture generated after merging as a duplicated content.

Another preferred embodiment of the present invention also provides an information-duplication method, including:

in response to a duplication operation of the display content on the electronic device, determining a selection region according to the duplication operation;

acquiring the text information in the selection region;

converting the text information into pictures;

acquiring the pictures in the selection region; and merging the pictures converted from the text information with the pictures acquired in the selection region, and sharing the picture generated after merging as a duplicated content.

Another preferred embodiment of the present invention further provides an electronic device, including:

a display unit, configured to present the display content to the user of the electronic device;

a memory, configured to store program instructions;

a processor, configured to communicate with the display unit and the memory and, when the program instructions are executed, perform the following operations:

in response to a duplication operation of the display content on the electronic device, determining a selection region according to the duplication operation;

acquiring the text information in the selection region;

converting the text information into pictures;

acquiring the pictures in the selection region; and merging the pictures converted from the text information with the pictures acquired in the selection region, and sharing the picture generated after merging as a duplicated content.

Another preferred embodiment of the present invention further provides a non-transitory machine-readable storage medium having executable code stored thereon. When the executable code is executed by a processor, the processor implements the information-duplication method described above.

Compared to the existing technology, the information-duplication system and the information-duplication method provided by the preferred embodiments of the present invention convert the text information of the display content into pictures when duplicating the display content on the electronic device, and then merge the pictures converted from the text information with the pictures in the display content to obtain the duplication content, such that the duplication content is consistent with the originally displayed content. Converting the text information into pictures may be able to avoid restrictions on the number of the characters in some sharing channels. By controlling the size or shape of the selection region, the unnecessary content is excluded from the selection region, so that the duplicated content obtained through duplication includes only the content that the user is interested in.

In order to make the above objects, features and advantages of the present invention more obvious and easy to understand, the following preferred embodiments will be described in detail with reference to the accompanying drawings.

BRIEF DESCRIPTION OF THE DRAWINGS

In order to more clearly illustrate the technical solutions of the embodiments of the present invention, the drawings used in the embodiments will be briefly described below. It should be understood that the following drawings merely illustrate some embodiments of the present invention, and therefore should not be considered as a limitation of the scope, for those of ordinary skill in the art, without any creative work, other relevant drawings may also be obtained based on these drawings.

DESCRIPTION OF MAJOR COMPONENTS SYMBOLS

| Electronic device | 100 |
| --- | --- |
| Information-duplication system | 110 |
| Memory | 111 |
| Memory controller | 112 |
| Processor | 113 |
| Peripheral interface | 114 |
| Input/output unit | 115 |
| Audio unit | 116 |
| Display unit | 117 |
| Radio frequency (RF) unit | 118 |
| Selected-region determination module | 1101 |
| First acquisition module | 1102 |
| Conversion module | 1103 |
| Creation sub-module | 11031 |
| Writing sub-module | 11032 |
| Second acquisition module | 1104 |
| Merging module | 1105 |
| Labeling module | 1106 |
| Application program | 210 |

DETAILED DESCRIPTION

A clear and complete description of the technical solutions according to the embodiments of the present invention will be provided in the following with reference to the accompanying drawings of the embodiments of the present invention. Obviously, the described embodiments are merely some but not all of the embodiments of the present invention. The components of the embodiments of the present invention, which are generally described and illustrated in the accompanying drawings herein, may be arranged and designed in a variety of different configurations. Therefore, the following detailed description of the embodiments of the present invention provided in the accompanying drawings is not intended to limit the claimed scope of the present invention, but is merely representative of selected embodiments of the present invention. Based on the embodiments of the present invention, all other embodiments obtained by those skilled in the art without any creative work should fall within the protection scope of the present invention.

It should be noted that similar labels and letters refer to similar items in the following figures, and therefore, once an item is defined in a figure, it may not need to be further defined and explained in subsequent figures. Meanwhile, in the description of the present invention, the terms "first", "second", etc. are used only to distinguish the description and cannot be interpreted as indicating or suggesting relative importance.

Figure 1:
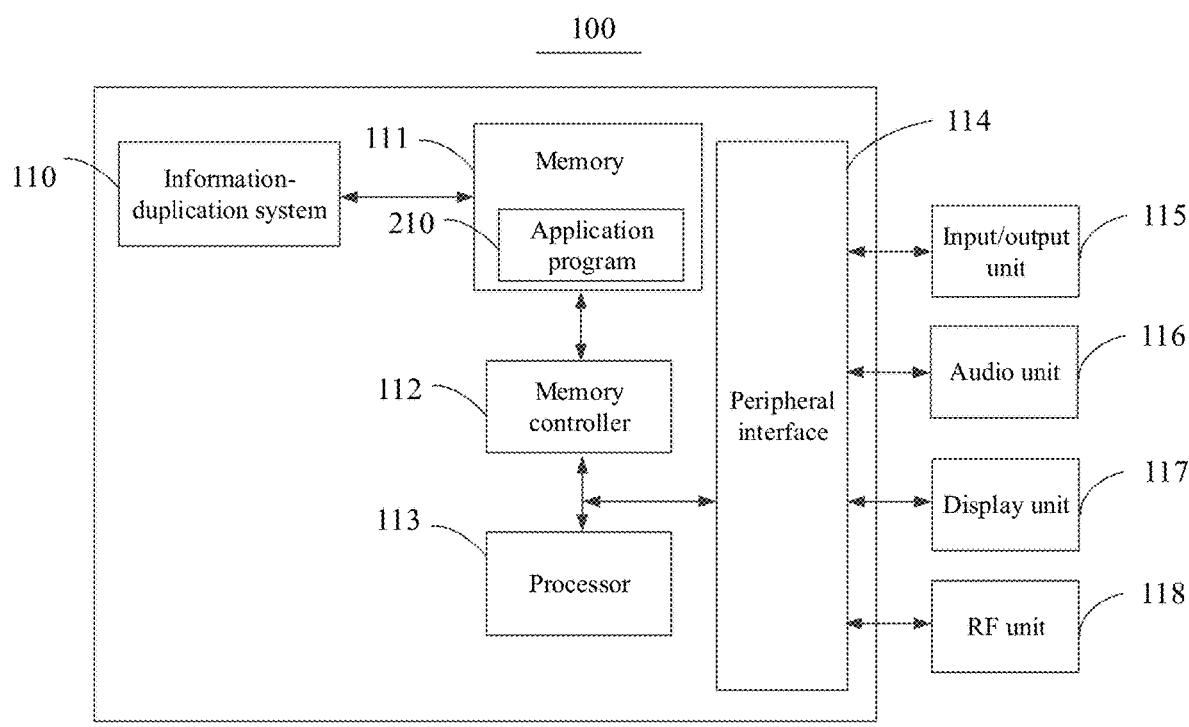
FIG. 1 illustrates a schematic block diagram of an electronic device provided by a preferred embodiment of the present invention.

Referring to FIG. 1, which illustrates a schematic block diagram of an electronic device 100 according to an embodiment of the present invention, the electronic device 100 may include an information-duplication system 110, a memory 111, a memory controller 112, a processor 113, a peripheral interface 114, an input/output unit 115, an audio unit 116, a display unit 117, and a radio frequency (RF) unit 118. In the embodiments, the electronic device 100 may include, but is limited to, a smart phone, a tablet computer, a notebook computer, a personal computer, a personal digital assistant, a mobile internet device, etc.

The memory 111, the memory controller 112, the processor 113, the peripheral interface 114, the input/output unit 115, the audio unit 116, the display unit 117, and the RF unit 118 may be electrically connected to each other through a direct or indirect manner to achieve data transmission or communication. For example, these components may be electrically connected to each other through one or more communication buses or signal lines. The information-duplication system 110 may include at least one software function module that can be stored in the memory 111 or in an operating system (OS) of the electronic device 100 in the form of software or firmware. The memory 111 may store an application program 210 downloaded and installed by the electronic device 100. The processor 113 may be configured to execute the executable modules stored in the memory 111, such as software function modules and computer programs included in the information-duplication system 110.

Among them, the memory 111 may be, but is not limited to, a random access memory (RAM), a read-only memory (ROM), a programmable read-only memory (PROM), an erasable programmable read-only memory (EPROM), an electrical erasable programmable read-only memory (EEPROM), etc. Among them, the memory 111 may be used to store a program, and the processor 113 may, after receiving an execution instruction, execute the program. The access to the memory 111 by the processor 113 and other possible components may be performed under the control of the memory controller 112.

The processor 113 may be an integrated circuit chip with signal processing capabilities. The above-mentioned processor 113 may be a general-purpose processor, including a central processing unit (CPU), a network processor (NP), etc.; or may be a digital signal processor (DSP), an application-specific integrated circuit (ASIC), a field-programmable gate, or other programmable logic device, discrete gate or transistor logic device, or discrete hardware component that can implement or execute various methods, steps, or logic blocks disclosed in the embodiments of the present invention. A general purpose processor may be a microprocessor, or the processor may be any conventional processor, etc.

The peripheral interface 114 may couple various input/output devices to the processor 113 and the memory 111. In some embodiments, the peripheral interface 114, the processor 113, and the memory controller 112 may be implemented in a single chip. In other embodiments, they may be implemented by separate chips.

The input/output unit 115 may be configured to provide a user input data to implement the communication between the user and the electronic device 110. The input/output unit 115 may be, but is not limited to, a mouse, a keyboard, etc.

The audio unit 116 may provide a user with an audio interface including one or more microphones, one or more speakers, and an audio circuit.

The display unit 117 may provide a communication interface (e.g., a user operation interface) between the electronic device 100 and the user, or may be configured to display image data. In the embodiment, the display unit 117 may be a liquid crystal display or a touch display. In the case of a touch display, the display unit 117 may be a capacitive touch screen or a resistive touch screen that supports single-point and multi-point touch operations. Supporting single-point and multi-point touch operations may refer to that the touch display can sense touch operations generated at one or more locations on the touch display, and pass the sensed touch operations to the processor 113 for calculation and processing.

The RF unit 118 may be configured to receive and transmit radio wave signals (such as electromagnetic waves), and realize the conversion between radio waves and electrical signals. As such, downloading the application program 210 from the network by the electronic device 100, or online reading through the application program 210 can be implemented.

Figure 2:
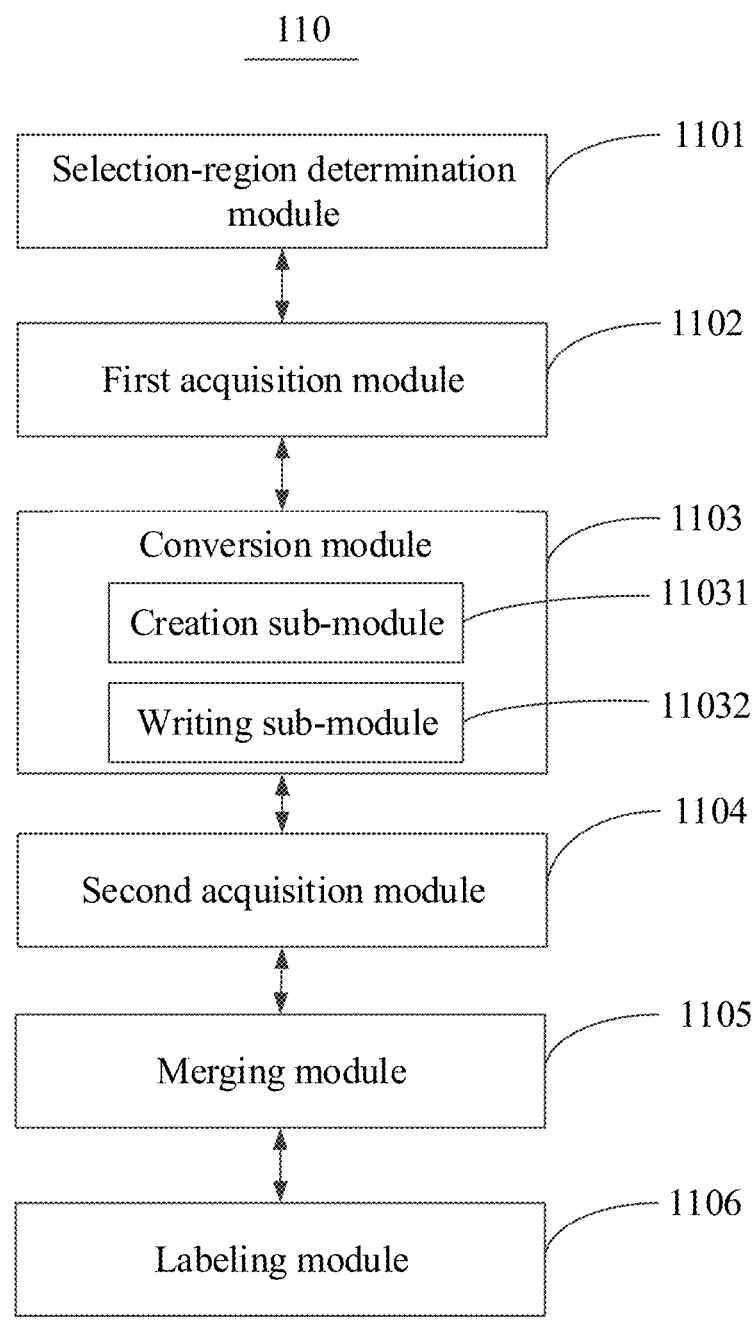
FIG. 2 illustrates a functional block diagram of an information-duplication system in the electronic device shown in FIG. 1.

Referring to FIG. 2, which illustrates a functional block diagram of the information-duplication system 110 shown in FIG. 1 provided by a preferred embodiment of the present invention, the information-duplication system 110 may include a selection-region determination module 1101, a first acquisition module 1102, a conversion module 1103, a second acquisition module 1104, and a merging module 1105.

The selection-region determination module 1101 may be configured to, in response to a display content duplication operation of the electronic device 100, determine a selection region according to the duplication operation.

Specifically, a user may enter a duplication mode through a touch operation (e.g., a long press operation) on the display content of the electronic device 100, and may then change the size or shape of the selection region by sliding the hand such that the content of interest to the user may be all included in the selection region. Compared to directly taking screenshots, by controlling the size or shape of the selection region, the selection of each text or picture can be flexibly controlled so that no extra information may be included in the selection region.

In one embodiment, the display content may include visual contents containing text information and pictures displayed through a user communication interface of various application programs 300 installed on the electronic device 100. The application programs 300 may include, but are not limited to, reading software, browsing software, editing software, etc. The reading software may be, for example, news software, novel software, or electronic magazine software. The browsing-type software may be, for example, a UC browser, a Baidu browser, a QQ browser, etc. The editing software may be WORD, PPT, etc.

The selection region may include only text information or only pictures, or may include both text information and pictures. In one embodiment, a selection region including both text information and pictures is mainly described.

The first acquisition module 1102 may be configured to acquire the text information in the selection region.

Specifically, in a preferred implementation example of one embodiment, the text information obtained by the first acquisition module 1102 may be a text string corresponding to the text information in the selection region.

The conversion module 1103 may be configured to convert the text information into pictures.

Referring to FIG. 2, in one embodiment, the conversion module 1103 may further include a creation sub-module 11031 and a writing sub-module 11032. The creation sub-module 11031 may be configured to create an image container including a bitmap object. The writing sub-module 11032 may be configured to write the text information acquired in the selection region into the image container to obtain a bitmap containing the text information.

The specific process of converting the text information into pictures is described in detail by taking the Android system as an example. Of course, it should be understood that the concepts for converting text information into pictures described below may be applied to other operating systems (e.g., iOS). The image container may be implemented by Canvas objects in the Android system.

The creation sub-module 11031 may create a Canvas object, and the Canvas object may include a bitmap object.

The writing sub-module 11032 may, by calling the DrawText function through Canvas objects, write the text string corresponding to the text information into Canvas objects. The text string may be mapped to a bitmap such that a bitmap containing the text information may be obtained.

In one embodiment, the code for converting the above text information into pictures in the Android system may be as follows:

Bitmap picture=BitmapFactory.decodeFile(pictureDir);// acquiring a cover picture Bitmap textBitmap=BitmapFactory.createBitmap(width, height, config);

Canvas canvas=new Canvas(textBitmap);

Canvas.drawText(string);//writing the text string into textBitmap of Canvas;

The background of the text information in the originally displayed content may also be retained in the bitmap formed by the above code.

In a preferred implementation example of one embodiment, the writing sub-module 11032 may also write related information corresponding to the display content into the Canvas object. The related information may include description information related to the display content (for example, when the display content is a part of a novel, the related information may be a brief introduction of the author of the novel or a relationship between the characters in the novel, etc.) and product information (for example, promotion information of a software APP or product introduction, etc.).

The second acquisition module 1104 may be configured to acquire the pictures in the selection region.

Referring to FIG. 2, in one embodiment, the information-duplication system 110 may further include a labeling module 1106, configured to identify each picture of the display content using a unique identifier. The identifier may include the relative position of the picture with respect to the text information. The relative position may include, but is not limited to, a distance between the picture and the text information, two parts of the text information that the picture is located between, and so on. The identifier may also establish a one-to-one mapping relation with the storage address of each picture. Specifically, the identifier may be a text message composed of a text string.

In a preferred implementation example of one embodiment, the second acquisition module 1104 may acquire a storage address corresponding to the picture according to the identifier corresponding to the picture in the selection region, and then acquire the picture from the storage address.

The merging module 1105 may be configured to merge the pictures converted from the text information with the pictures acquired in the selection region, and then share the picture generated after merging as a duplicated content.

The merging module 1105 may merge the bitmap, obtained by converting the text information through the conversion module 1103, with the pictures acquired by the second acquisition module 1104 to form a complete picture, and then share the complete picture as a duplicated content.

Specifically, the method for sharing the picture after merging as the duplicated content may include publishing the duplicated content through a network platform. For example, the network platform may be social communication software (such as QQ, WeChat, Weibo, etc.). The method for sharing may also include collecting and storing the duplicated content on the electronic device 100. It should be noted that the method for sharing described in the embodiment may not be limited to the methods described above, and any other possible similar alternative sharing methods should be included in the scope of the embodiments of the present invention.

In one embodiment, the code for merging the pictures in the Android system may be as follows:

Canvas Canvas=new Canvas(Bitmap);
Canvas.drawBitmap(0,0,Picture);
Canvas.drawBitmap(0,height,textBitmap);

The merging module 1105 may sequentially splice the pictures converted from the text information and the pictures acquired in the selection region according to the arrangement order of the text information and the pictures in the selection region to form a merged picture.

Figure 3:
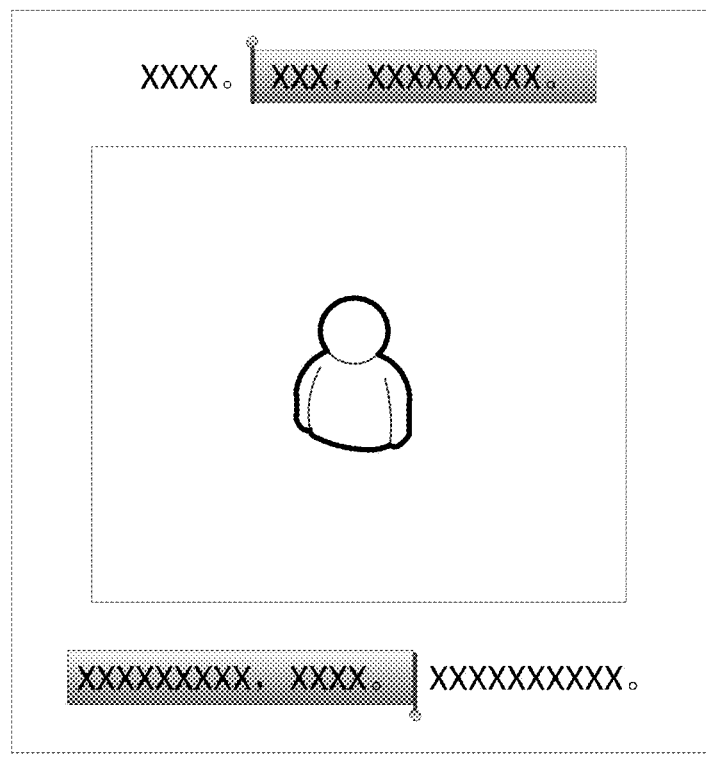
FIG. 3 illustrates a schematic diagram of performing a region selection operation on a display content of the electronic device shown in FIG. 1.

In a preferred implementation example of one embodiment, the merging module 1105 may number the text information according to the relative position recorded in the identifier corresponding to the pictures in the selection region. Referring to FIG. 3, for example, a picture is included in the selection region, and the text information located above the identifier may be marked as number 1, the text information located below the identifier may be marked as number 3, and the picture may be marked as number 2. The merging module 1105 may be only required to sequentially splice the pictures converted from the text information and the picture in the selection region from top to bottom in the numbering sequence mentioned above. Through the above relative positions, it may be able to ensure that the content of the spliced picture is consistent with the format of the originally displayed content.

Through the above information-duplication system, when duplicating the display content on the electronic device 100, the text information of the display content may be converted into pictures, and the pictures converted into the text information may then be merged with the pictures in the display content to obtain a duplication content, such that the duplication content may be consistent with the original content. Converting text information into pictures may be able to avoid restrictions on the number of the characters in some sharing channels. By controlling the size or shape of the selection region, the unnecessary content is excluded from the selection region, so that the duplicated content obtained through duplication includes only the content that the user is interested in.

Figure 4:
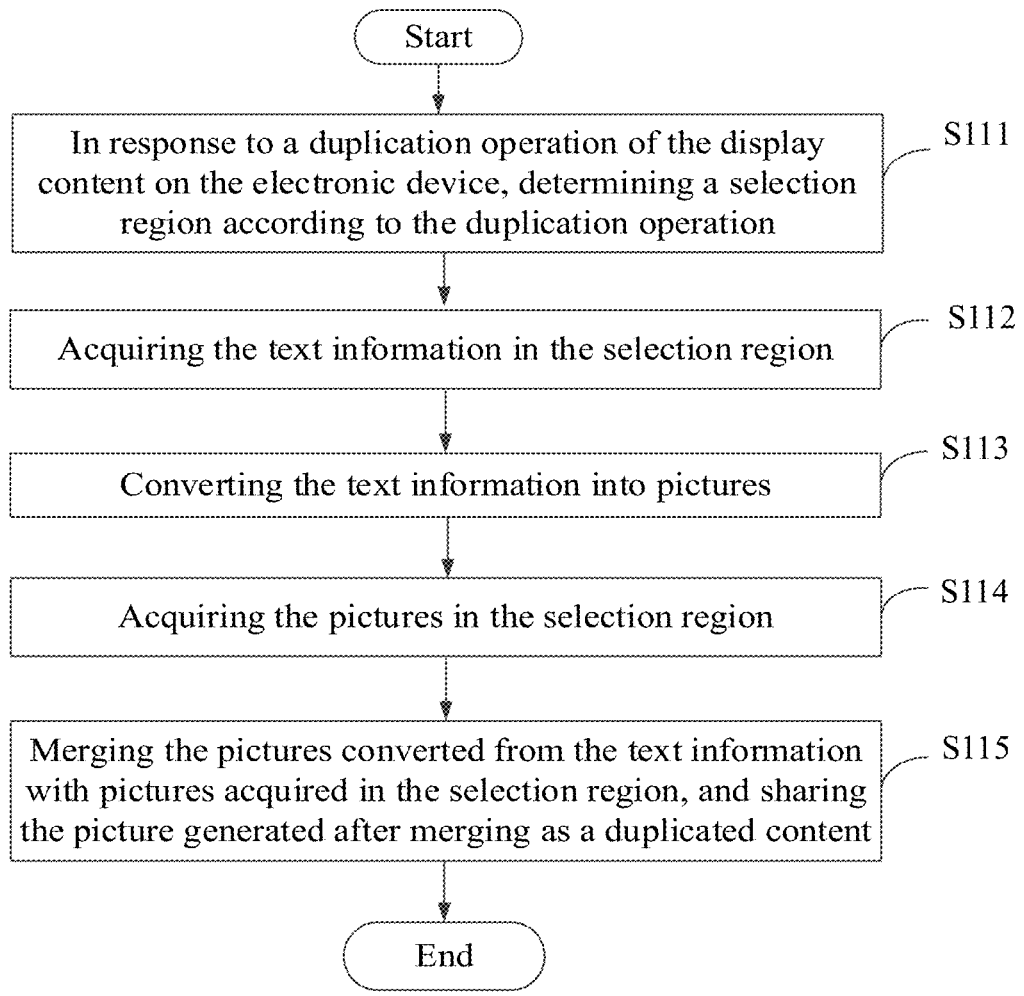
FIG. 4 illustrates a flowchart of an information-duplication method applied to the electronic device shown in FIG. 1 according to a preferred embodiment of the present invention.

Referring to FIG. 4, which illustrates a flowchart of an information-duplication method applied to the electronic device 100 shown in FIG. 1 according to a preferred embodiment of the present invention, the steps defined by the flowchart related to the method may be implemented by the processor 113. The specific process shown in FIG. 4 will be described in detail below.

In step S111, in response to a duplication operation of the display content on the electronic device 100, a selection region may be determined according to the duplication operation.

Specifically, a user may enter a duplication mode through a touch operation (e.g., a long press operation) on the display content of the electronic device 100, and then the user may change the size or shape of the selection region by sliding the hand such that the content of interest to the user may be all included in the selection region. Compared to directly taking screenshots, by controlling the size or shape of the selection region, the selection of each text or picture can be flexibly controlled so that no extra information may be included in the selection region.

In one embodiment, the display content may be displayed on the electronic device 100 through application programs 300. The application programs 300 may include, but are not limited to, news software (such as NetEase news, Baidu news, Sohu news, etc.), novel software (such as Shuqi Novel, Zhuixiaoshuo Free Novel, 91 Panda Reading, etc.), electronic magazine software (such as Weekend Pictorial, Bloomberg Business Weekly, First Financial Weekly, etc.), and browsing-type software (such as UC browser, Baidu browser, QQ browser, etc.).

The selection region may include only text information or only pictures, or may include both text information and pictures. In one embodiment, a selection region including both text information and pictures is mainly described.

In step 112, the text information in the selection region may be acquired.

Specifically, in a preferred implementation example of one embodiment, the text information obtained by the electronic device may be a text string corresponding to the text information in the selection region.

In step 113, the text information may be converted into pictures.

Figure 5:
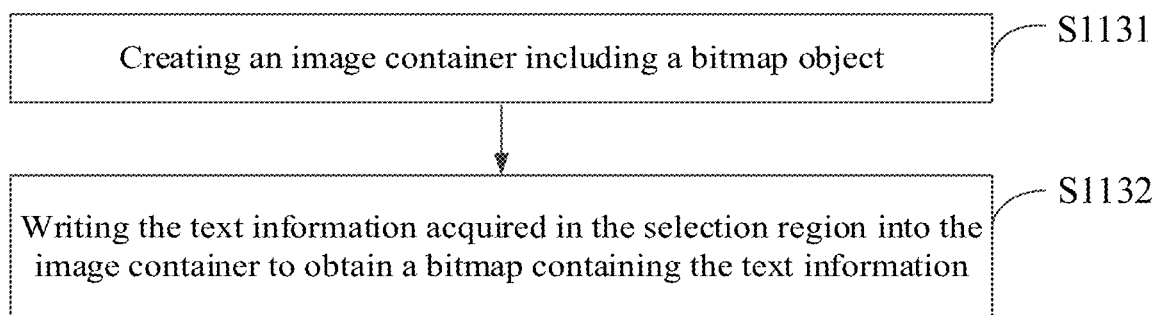
FIG. 5 illustrates a part of the flowchart of an information-duplication method according to another preferred embodiment of the present invention.

Referring to FIG. 5, in one embodiment, step S113 may also include sub-step S1131 and sub-step S1132. In sub-step S1131, an image container including a bitmap object may be created. In sub-step S1132, the text information acquired in the selection region may be written into the image container to obtain a bitmap that contains the text information.

The specific process of converting the text information into pictures is described in detail by taking the Android system as an example. Of course, it should be understood that the concepts for converting text information into pictures described below may be applied to other operating systems (e.g., iOS). The image container may be implemented by Canvas objects in the Android system.

In sub-step S1131, a Canvas object may be created, and the Canvas object may include a bitmap object.

In sub-step S1132, by calling the DrawText function through Canvas objects, the text string corresponding to the text information may be written into Canvas objects. The text string may be mapped to a bitmap such that a bitmap containing the text information may be obtained.

In one embodiment, the code for converting the above text information into pictures in the Android system may be as follows:

Bitmap picture=BitmapFactory.decodeFile(pictureDir);//acquiring a cover picture
Bitmap textBitmap=BitmapFactory.createBitmap(width, height, config);
Canvas canvas=new Canvas(textBitmap);
Canvas.drawText(string);//writing the text string into textBitmap of Canvas;

In a preferred implementation example of one embodiment, the electronic device 100 may also write related information corresponding to the display content into the Canvas object. The related information may include description information related to the display content (for example, when the display content is a part of a novel, the related information may be a brief introduction of the author of the novel or a relationship between the characters in the novel, etc.) and product information (for example, promotion information of a software APP or product introduction, etc.).

In step S114, pictures in the selection region may be acquired.

In one embodiment, prior to step S111, the information-duplication method may further include the following step: labeling each picture of the display content using a unique identifier. The identifier may include the relative position of the picture with respect to the text information. The relative position may include, but is not limited to, a distance between the picture and the text information, two parts of text information that the picture is located between, and so on. The identifier may also establish a one-to-one mapping relation with the storage address of each picture. Specifically, the identifier may be a text message composed of a text string.

In a preferred implementation example of one embodiment, the electronic device 100 may acquire a storage address corresponding to the picture according to the identifier corresponding to the picture in the selection region, and then acquire the picture from the storage address.

In step S115, the pictures converted from the text information may be merged with the pictures acquired in the selection region, and the picture generated after merging may be shared as a duplicated content.

The electronic device may merge the bitmap, obtained by converting the text information in step S113, with the pictures acquired in step S114 to form a complete picture, and then share the complete picture as a duplicated content.

In one embodiment, the code for merging the pictures in the Android system may be as follows:

Canvas Canvas=new Canvas(Bitmap);
Canvas.drawBitmap(0,0,Picture);
Canvas.drawBitmap(0,height,textBitmap);

The electronic device 100 may sequentially splice the pictures converted from the text information and the pictures acquired in the selection region according to the arrangement order of the text information and the pictures in the selection region to form a merged picture.

In a preferred implementation example of one embodiment, the electronic device may number the text information according to the relative position recorded in the identifier corresponding to the pictures in the selection region. Referring to FIG. 3, for example, a picture is included in the selection region, and the text information located above the identifier may be marked as number 1, the text information located below the identifier may be marked as number 3, and the picture may be marked as number 2. When performing picture merging, the merging module may only need to splice the pictures converted from the text information and the picture in the selection region from top to bottom in the order of the labeling numbers mentioned above. Through the relative positions described above, the content of the spliced picture may be ensured to be consistent with the format of the originally displayed content.

According to various embodiments provided by the present application, it should be understood that the disclosed device and method may also be implemented in other manners. The device embodiments described above are merely illustrative, for example, the flowcharts and the block diagrams in the figures may illustrate the system architecture, functionality, and operations that can be possibly implemented by the devices, the methods, and the computer program products according to various embodiments of the present invention. In this regard, each block of the flowchart or the block diagram may represent a module, a program segment, or a portion of code. The module, the program segment, or the portion of code may include one or more executable instructions used to implement specific logic functions. It should also be noted that in some alternative implementations, the functions marked in the blocks may be implemented in an order different from the one illustrated in the drawings. For example, two consecutive blocks may be executed substantially in parallel, or may sometimes be executed in a reverse order, depending upon the functionalities involved. It should also be noted that each block of the block diagrams and/or flowcharts, and combinations of the blocks in the block diagrams and/or flowcharts, can be implemented by a dedicated hardware-based system that executes specified functions or operations or, alternatively, implemented by a combination of dedicated hardware and computer instructions.

In addition, the functional modules in each embodiment of the present invention may be integrated together to form an independent part, or may exist separately. Alternatively, two or more than two above modules may be integrated to form a separate part.

The functions, when implemented in the form of software function modules and sold or used as separate products, may be stored in a computer readable storage medium. Based on such understanding, the essential part of the technical solution of the present invention or the part that contributes to the existing technology may be implemented in the form of a software product. The software product may be stored in a storage medium, including a number of instructions to cause a computer device (which may be a personal computer, server, or network device, etc.) to perform all or part of the steps of the methods described in various embodiments of the present invention. The foregoing storage medium may include: a U-disk, a mobile hard disk, a read-only memory (ROM), a random access memory (RAM), a magnetic disk, an optical disk, and any other medium that can store program code.

It should be noted that, in this context, relational terms such as first, second, etc. are used merely to distinguish one entity or operation from another entity or operation, and do not necessarily require or imply any such actual relationship or order between these entities or operations. Furthermore, the term "comprise", "include", or any other variants thereof is intended to encompass a non-exclusive inclusion, such that a process, method, article, or device that comprises a plurality of elements not only includes those elements but also includes other elements that are not explicitly listed, or elements that are inherent to such a process, method, item, or device. Without further limitation, an element that is defined by the phrase "comprising a . . . " does not exclude the presence of additional equivalent elements in the process, method, item, or device that comprises the element.

The above description is only the preferred embodiments of the present invention, and is not intended to limit the present invention. It should be apparent to those skilled in the art that various modifications and changes can be made to the present invention. Any modifications, equivalent substitutions, improvements, etc. made within the spirit and scope of the present invention should be included in the scope of the present invention. It should be noted that similar reference numbers and letters indicate similar items in the following figures, and therefore, once an item is defined in a drawing, it is not necessary to further define and explain it in the subsequent drawings.

The above is only the specific embodiments of the present invention, but the scope of the present invention is not limited thereto, and any person skilled in the art can easily think of changes or substitutions within the technical scope of the present invention. It should be covered by the scope of the present invention. Therefore, the scope of the invention should be determined by the scope of the claims.

What is claimed is:

1. An information-duplication method by an electronic device, comprising:
   receiving, by the electronic device, a duplication operation of a display content on the electronic device;
   determining, by the electronic device, a selection region according to the duplication operation, wherein:
     the selection region includes text information and pictures, and
     the text information and the pictures originally in the selection region have a fixed position arrangement there-between;
   acquiring, by the electronic device, the text information in the selection region;
   converting, by the electronic device, the text information into text-converted pictures;
   acquiring, by the electronic device, the pictures originally in the selection region; and
   merging the text-converted pictures with the pictures originally in the selection region to form a merged picture, wherein:
     the merged picture provides content duplicating the text information and the pictures originally in the selection region with the fixed position arrangement there-between, and
     the merged picture is sharable as a duplicated content of the selection region.

2. The information-duplication method according to claim 1, wherein prior to determining the selection region according to the duplication operation, the method further includes:
   labeling each picture of the pictures originally in the selection region of the display content using a unique identifier, wherein:
     the identifier includes the fixed position arrangement of each picture relative to the text information, and
     the identifier further includes a one-to-one mapping relation between each picture and a storage address thereof.

3. The information-duplication method according to claim 1, wherein acquiring the pictures originally in the selection region includes:
   acquiring a storage address corresponding to a picture according to an identifier corresponding to the picture originally in the selection region, and
   acquiring the picture from the storage address.

4. The information-duplication method according to claim 1, wherein converting the text information into the text-converted pictures includes:
   creating an image container including a bitmap object; and
   writing the text information acquired in the selection region into the image container to obtain a bitmap containing the text information.

5. The information-duplication method according to claim 4, wherein converting the text information into the text-converted pictures further includes:
   writing related information, corresponding to the display content but non-included in the selected region, into the image container.

6. The information-duplication method according to claim 1, wherein merging the text-converted pictures with the pictures originally in the selection region includes:
   sequentially splicing the text-converted pictures and the pictures originally in the selection region according to an arrangement order of the text information and the pictures originally in the selection region to form the merged picture.

7. The information-duplication method according to claim 1, wherein:
   the display content includes visual contents containing text information and pictures displayed through a user communication interface of application programs installed on the electronic device, and the application programs include any one of reading software, browser software, and editing software.

8. The information-duplication method according to claim 1, further including:
   sharing the merged picture as the duplicated content using at least one of following methods:
     publishing the duplicated content through a network platform; and
     collecting and storing the duplicated content on the electronic device.

9. An electronic device, comprising:
   a memory, configured to store program instructions; and
   a processor, configured to communicate with the memory and, when the program instructions are executed, to:
     receive a duplication operation of the display content on the electronic device;
     determine a selection region according to the duplication operation, wherein:
       the selection region includes text information and pictures, and
       the text information and the pictures originally in the selection region have a fixed position arrangement there-between;
     acquire the text information in the selection region;
     convert the text information into text-converted pictures;
     acquire the pictures originally in the selection region; and
   merge the text-converted pictures with the pictures originally in the selection region to form a merged picture, wherein:
     the merged picture provides content duplicating the text information and the pictures originally in the selection region with the fixed position arrangement there-between, and
     the merged picture is sharable as a duplicated content of the selection region.

10. The electronic device according to claim 9, wherein prior to determining the selection region according to the duplication operation, the processor is further configured to:
    label each picture of the pictures originally in the selection region of the display content using a unique identifier, wherein:
      the identifier includes the fixed position arrangement of each picture relative to the text information, and
      the identifier further includes a one-to-one mapping relation between each picture and a storage address thereof.

11. The electronic device according to claim 10, wherein the processor is further configured to:
    acquire a storage address corresponding to a picture according to an identifier corresponding to the picture originally in the selection region, and
    acquire the picture from the storage address.

12. The electronic device according to claim 9, wherein the processor is further configured to:
- create an image container including a bitmap object; and
- write the text information acquired in the selection region into the image container to obtain a bitmap containing the text information.

13. The electronic device according to claim 12, wherein the processor is further configured to:
- write related information, corresponding to the display content but non-included in the selected region, into the image container.

14. The electronic device according to claim 9, wherein the processor is further configured to:
- sequentially splice the text-converted pictures and the pictures originally in the selection region according to an arrangement order of the text information and the pictures originally in the selection region to form the merged picture.

15. The electronic device according to claim 9, wherein:
- the display content includes visual contents containing text information and pictures displayed through a user communication interface of application programs installed on the electronic device, and the application programs include any one of reading software, browser software, and editing software.

16. The electronic device according to claim 9, wherein the processor is further configured to:
- share the merged picture as the duplicated content using at least one of following methods:
  - publishing the duplicated content through a network platform; and
  - collecting and storing the duplicated content on the electronic device.

17. The electronic device according to claim 9, further including:
- a display unit, coupled with the processor and configured to present a display content to a user of the electronic device.

18. A non-transitory computer-readable storage medium, containing program instructions for, when executed by a processor, performing an information-duplication method, the method comprising:
- receiving, by the electronic device, a duplication operation of a display content on the electronic device;
- determining, by the electronic device, a selection region according to the duplication operation, wherein:
  - the selection region includes text information and pictures, and
  - the text information and the pictures originally in the selection region have a fixed position arrangement there-between;
- acquiring, by the electronic device, the text information in the selection region;
- converting, by the electronic device, the text information into text-converted pictures;
- acquiring, by the electronic device, the pictures originally in the selection region; and
- merging the text-converted pictures with the pictures originally in the selection region to form a merged picture, wherein:
  - the merged picture provides content duplicating the text information and the pictures originally in the selection region with the fixed position arrangement there-between, and
  - the merged picture is sharable as a duplicated content of the selection region.

19. The storage medium according to claim 18, wherein prior to determining the selection region according to the duplication operation, the method further includes:
- labeling each picture of the pictures originally in the selection region of the display content using a unique identifier, wherein:
  - the identifier includes the fixed position arrangement of each picture relative to the text information, and
  - the identifier further includes a one-to-one mapping relation between each picture and a storage address thereof; and wherein acquiring the pictures originally in the selection region includes:
- acquiring a storage address corresponding to a picture according to an identifier corresponding to the picture originally in the selection region, and
- acquiring the picture from the storage address.

20. The storage medium according to claim 18, wherein converting the text information into the text-converted pictures includes:
- creating an image container including a bitmap object; and
- writing the text information acquired in the selection region into the image container to obtain a bitmap containing the text information.

* * * * *